500# UNITED STATES PATENT OFFICE.

THOMAS R. DUGGAN, OF NEW YORK, N. Y., ASSIGNOR TO THE PERMUTIT COMPANY, OF NEW YORK, N. Y., A CORPORATION OF DELAWARE.

PROCESS OF PRODUCING REACTIVE ZEOLITES.

1,116,038.  Specification of Letters Patent.  Patented Nov. 3, 1914.

No Drawing.  Application filed July 12, 1913.  Serial No. 778,712.

*To all whom it may concern:*

Be it known that I, THOMAS R. DUGGAN, a citizen of Great Britain, residing at New York, in the county of New York and State of New York, have invented certain new and useful Improvements in Processes of Producing Reactive Zeolites, of which the following is a specification.

This invention relates to processes of producing reactive zeolites; and it comprises a method of producing zeolitic material for use in the purification of water and other liquids wherein potash-containing aluminous silicates are fused with such other substances as may be necessary to obtain a hard glassy melt containing about half its weight of alumina and silica (in a ratio of approximately 1:2 or 2:5), the residue consisting of soda and potash with a ratio of approximately 5:1 and the material thus obtained is converted into hard grained highly reactive material by granulation and treatment with water in a methodical way; all as more fully hereinafter set forth and as claimed.

In the purification of water and of other liquids, a process of fixing and removing impurities with the aid of certain hydrated insoluble silicates (exchange silicates) has come into use. In this process, a fused composition of a glassy nature, containing both silica and alumina united to bases is first provided, this composition being of such a chemical constitution that it can be hydrated to give an insoluble material readily reactive with aqueous solutions. If, for example, a fused composition be made with correct proportions of silica, alumina and alkali and this composition be then hydrated, the hydrated composition on contact with a "hard" water is found to "exchange" bases, taking up lime and magnesia in an insoluble form and giving up a corresponding amount of alkali to the solution. Water may thus be rapidly and effectually freed of hardness-giving solubles, such as sulfate and carbonate of lime. Suitable zeolites may be devised for removing other solubles, such as iron, manganese, potash, etc., from water or other liquids. The "exchange" is in the nature of a "mass action." When the absorption of lime begins to slow up by reason of the zeolite being charged therewith, the reverse exchange can be effected by washing the zeolite with a solution of a salt of an alkaline base. The lime and magnesia now go into solution while the alkali takes their place in the zeolite. After washing out the soluble salt, the zeolite is ready for re-use. This alternating process of removing lime from water and revivifying may be carried on indefinitely. In practice, hard water is filtered through a granular bed of soda zeolite until the zeolite has taken up a certain amount of lime and then a brine is run through the zeolite bed to revive it.

In the described process, which has gone into extensive use, the capacity of a given installation for the treatment of water or other liquid of course depends not only on the chemical nature and degree of hydration of the zeolite and consequently its powers of "exchange," but also very materially upon its physical character. A filter or treatment bed should be as granular and porous and offer as much surface as possible to liquid flowing through the bed without being so soft as to mash down or channel readily. The chemical and physical requirements are somewhat conflicting and the physical conditions are best satisfied by a zeolite in rather small granules of a particular hard yet open texture since naturally the greater the surface of the zeolite which can be exposed to water or the like the more liquid can be treated by a given weight of it in a time unit. Nevertheless this hard material must be highly reactive chemically. The methods heretofore proposed for producing such material have not given these qualities to such an extent as is desirable. Much depends on the composition of the melt and on the treatment to which it is afterward exposed. Some compositions on treatment with water are apt to give materials which are either too soft or are too hard and compact and non-reactive to be capable of the highest possible utility. The active material must be in small grains individually strong enough to sustain the weight of a bed having a considerable thickness of material, hard enough to resist erosion and breaking up or channeling by the action of flowing currents of liquid, and of such a shape as not to compact and reduce the porosity of the mass;

while further the granules must be of such character as to expose as much surface as possible to the flowing liquid; a surface greater than their sheer outside surface—that is, they must be more or less porous. It is the purpose of the present invention to provide such a material; to give a highly reactive zeolite having good chemical and physical properties, being porous and of large surface while at the same time of relatively strong and resistant physical character and being also highly reactive chemically.

I have found that in making a highly reactive zeolite for water purification and the like it is advantageous to have a rather definite amount of potash as well as soda in the original composition; that by making a melt containing both soda and potash in a certain rather definite proportion, a glassy material is obtained which on granulating and on extracting and hydrating with water in a methodical way gives a highly reactive zeolite in hard strong grains; grains which combine a large area of highly reactive surface with a relatively high degree of mechanical strength. In making my material therefore I substitute a certain proportion of potash for the soda usually employed. The proportion of $K_2O$ to $Na_2O$ should be about 1:5 but may be raised somewhat. This potash is best obtained from natural potassiferous rocks, such as feldspar, phonolite, leucite, etc., wherein it occurs in silicate combination together with alumina. Orthoclase feldspar is one of the minerals best adapted for my purposes since it carries potash, alumina and silica in a combined form, readily capable of undergoing molecular rearrangements to give the particular glassy compounds here desired. Feldspar contains a relatively high amount of combined silica and for this reason also is a good component of a raw mix for making the fused glassy melt; free silica, as quartz or sand entering into reaction to form the melt rather slowly and being apt to give compositions of irregular character. A good composition may be made by melting together 56 parts of sodium carbonate or soda ash, 25 to 26 parts of feldspar, 12 parts of kaolin and 6 or 7 parts of potassium carbonate. Other proportions and other materials may be used in making the mix, using the ordinary stoichiometric principles to obtain about the same ratios of alumina, silica, soda and potash. With the mixture may be used more or less of the preformed glassy material to act as a flux, as such an addition materially quickens the rate of the fusion and the molecular rearrangement to which the formation of the zeolite yielding compounds is due. Phonolite, leucite, etc., may be substituted for the feldspar. In the mix for the glassy melt the relative amounts of alumina, silica, and total alkali should be about 3:7:13. The soda component may be furnished in whole or in part by the use of suitable amounts of sodium carbonate, sodium silicate (water glass), sodium sulfate, soda feldspar, etc. The alumina may come in whole or in part from bauxite, alunite, or from feldspar, kaolin, clay or other aluminous silicates. It is best however, for the present purposes to obtain as much as may be of the potash, silica and alumina from the readily fluxing and readily reacting orthoclase. The mixed materials may be fused on the hearth of any suitable furnace at a temperature between 1250° to 1500° C. As stated, an admixture of previously made material is desirable. After fusion the material will be found to be of a transparent glassy nature and, usually, of green color. It fractures readily.

The use of both soda and potash in the melt in some way operates in the subsequent treatment to give granules of better physical and chemical character. In making the zeolite, that is in the hydrating and washing out operations, much of the potash of the melt goes into solution but the finished zeolitic material still contains both potash and soda. After employment of the zeolite once or twice in purifying hard water and revivification with salt solution, most or all of this potash disappears and is replaced by soda, but the advantageous physical and chemical characteristics of the zeolite remain. The potash though useful in making the zeolite is a replaceable base which may be removed.

The glassy fused mass so obtained is, so to speak, a raw material and requires further treatment to obtain zeolites suitable for purifying water and other liquids. As made, it contains an excess of soluble bodies which must be removed; the material must be hydrated and it must be formed into granules of appropriate size and strength with as good a porosity as may be. I therefore treat the fused materials in a special way. The glassy material is first crushed by any suitable means, such as rolls, and is thereafter sifted. It is best in this sifting operation to select fragments between 1½ and 9 mm. diameter. The dust and fines may be sent back to the furnace and admixed with a fresh charge, thereby not only securing an economy in operation but also the stated advantageous fluxing effect of preformed material. Larger pieces may be recrushed. The granules thus obtained are sharp-edged, glassy fragments, are irregular in shape and are usually of a light green color. The next step is to place the granules in a shallow layer in a bath of boiling or hot water. Cold water with this material gives undesirable effects. Advantageously the layers may be supported on wire mesh trays in a bath of suitable character. The temperature of the water in this treatment may be between 90° and 100° C. A temperature of 90° C. is advantageous. Treatment with water at this temperature is continued for two or three hours during which time the glassy granules swell and burst into smaller sized pieces. The bath may be kept hot by steam. The water may be changed from time to time; or a continuous slow flow of water may be used. The original transparency and green color disappear, leaving an opaque pearly gray material of good physical character and porosity. The boiling or hot-hydration operation is complete when no cores or particles of a green glassy nature can be found on breaking open the larger lumps. The amount of water relative to the amount of glass should be rather large. The water extracts much alkali from the material, chiefly in the form of hydrates with small amounts of carbonates and silicates. After the operation the watery liquid may be concentrated and these bodies recovered. The expanded hydrated granules are next further crushed and sized to a diameter of about 2 mm. The granules are then washed or leached with water which may be cold or warm, until the wash water shows but little alkalinity. It is advantageous however to use hot and cold water, at 90° C. and at 15° C. alternately. The number of leachings of course depends on the circumstances but often 15 treatments with each are employed. Washing may be considered sufficient when 25 cc. of wash water do not require more than 5 drops of normal acid for neutralization. The washing may be done in a continuous manner, using the countercurrent principle; or the granules may be washed in a number of separate baths. Where separate baths are used, ordinarily 20 to 30 washings will be sufficient. The washed granules are next resifted in water, using about a 2 mm. mesh. They may then be dried in a centrifugal machine to give the finished zeolite.

The finished material consists of granules ranging between .5 and 2 mm. diameter. Finer material is rejected. These granules are of a light brownish color, are opaque, granular and more or less porous. They appear moist at first but on exposure to air dry down and become white. As the material leaves the centrifugals it contains about 50 per cent. of water of which 11 to 14 per cent. represents water of constitution or hydration, the remainder being moisture. In a properly arranged filter bed, the granules will take up about 3.5 per cent. of lime (CaO) before the rate of absorption becomes so slow as to make revivification advisable; and with the present material the absorption may be pushed to the total disappearance of alkali; that is until all the alkali is replaced by lime. The granules though hard and firm and capable of supporting considerable burden without breaking down or mashing, are nevertheless porous throughout. A granule of the fresh material when placed in contact with a phenolphthalein solution becomes pink throughout showing a high degree of porosity.

What I claim is:—

1. In the preparation of zeolitic purifying materials the process which comprises making a fused glassy melt comprising alumina, silica, potash and soda with a ratio of soda to potash of approximately 5:1, granulating and thereafter extracting alkalis with water.

2. In the preparation of zeolitic purifying materials the process which comprises making a fused glassy melt comprising alumina, silica, potash and soda with a ratio of soda to potash of approximately 5:1, granulating and thereafter treating with hot water.

3. In the preparation of zeolitic purifying materials the process which comprises making a fused glassy melt comprising alumina, silica, potash and soda with a ratio of soda to potash of approximately 5:1, granulating to a size between 1.5 and 9 mm. diameter and thereafter extracting alkalis with water.

4. In the preparation of zeolitic purifying materials the process which comprises making a fused glassy melt comprising alumina, silica, potash and soda with a ratio of soda to potash of approximately 5:1, granulating to a size between 1.5 and 9 mm. diameter, thereafter treating with hot water and thereafter recrushing to material of about a 2 mm. mesh.

5. In the preparation of zeolitic purifying materials, the process which comprises preparing a fused glassy melt, crushing to between 1.5 and 9 mm. diameter, extracting with hot water till the glassy character disappears, recrushing to material of about a 2 mm. mesh, washing and drying.

6. The process of making readily reactive zeolites which comprises making a glassy melt comprising alumina, silica and total alkali in about the ratio of 3:7:13, with about five times as much soda as potash, granulating and treating with hot water.

7. In the preparation of zeolitic water purifying materials the process which comprises granulating a glassy zeolitic melt, swelling and hydrating with hot water till all glassy appearance disappears, regranulating, washing and drying.

8. In the preparation of zeolitic purifying materials from zeolitic melts the process which comprises hydrating such a melt with hot water and leaching a plurality of times, such leaching being alternately with hot water and with water at the ordinary temperature.

9. In the preparation of zeolitic purifying materials the process which comprises making a fused glassy melt of orthoclase and other materials, such melt comprising alumina, silica and total alkali in about the ratio of 3:7:13 with about five times as much soda as potash, granulating and treating with hot water.

In testimony whereof, I affix my signature in the presence of two subscribing witnesses.

THS. R. DUGGAN.

Witnesses:
R. NICHOLSON, Jr.,
W. R. NICHOLSON.